United States Patent
Fukuda et al.

(10) Patent No.: US 8,086,191 B2
(45) Date of Patent: Dec. 27, 2011

(54) LEAKAGE POWER REDUCTION APPARATUS

(75) Inventors: Atsushi Fukuda, Yokosuka (JP); Hiroshi Okazaki, Zushi (JP); Shoichi Narahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 807 days.

(21) Appl. No.: 12/114,218

(22) Filed: May 2, 2008

(65) Prior Publication Data
US 2008/0279122 A1 Nov. 13, 2008

(30) Foreign Application Priority Data
May 7, 2007 (JP) ................................. 2007-122490

(51) Int. Cl.
*H04B 1/04* (2006.01)
(52) U.S. Cl. ...................................... 455/114.2; 455/83
(58) Field of Classification Search ................ 455/73, 455/78, 82, 83, 296, 303, 304, 305, 306, 455/307, 114.2
See application file for complete search history.

(56) References Cited

U.S. PATENT DOCUMENTS

| | | | |
|---|---|---|---|
| 6,313,713 B1 * | 11/2001 | Ho et al. ................... | 333/1.1 |
| 6,507,728 B1 | 1/2003 | Watanabe et al. | |
| 7,633,435 B2 * | 12/2009 | Meharry et al. .............. | 342/198 |
| 2006/0203751 A1 | 9/2006 | Dutertre et al. | |
| 2007/0015468 A1 * | 1/2007 | Kouki et al. .................. | 455/63.1 |
| 2008/0166981 A1 * | 7/2008 | Prikhodko et al. ............. | 455/83 |

FOREIGN PATENT DOCUMENTS

| | | |
|---|---|---|
| CN | 1246001 A | 3/2000 |
| FR | 2 853 784 | 10/2004 |
| JP | 2-116459 | 5/1990 |
| JP | 2-151130 | 6/1990 |
| JP | 9-116459 | 5/1997 |
| JP | 9-312587 | 12/1997 |
| JP | 2003-273770 | 9/2003 |
| KR | 2002-4344 | 1/2002 |

OTHER PUBLICATIONS

Office Action issued Dec. 28, 2010, in China Patent Application No. 200810088764.5 (with English translation).
The First Office Action issued on Aug. 23, 2011 for corresponding JP Patent Application No. 2007-122490, with English translation.

* cited by examiner

*Primary Examiner* — Nguyen Vo
(74) *Attorney, Agent, or Firm* — Oblon, Spivak, McClelland, Maier & Neustadt, L.L.P.

(57) ABSTRACT

A circulator extracts a transmission signal sent from a transmitter to antenna via the circulator and a duplexer, reflected by an antenna, and returned via the duplexer to the transmitter side. The amplitude and phase of the extracted signal are adjusted by an amplitude-and-phase adjuster to generate an offset signal having the same amplitude and the opposite phase with respect to a leaking transmission signal included in a signal output from a third terminal of the duplexer when combined by a combiner. The offset signal is combined in the combiner with the leaking transmission signal included in the signal output from the third terminal of the duplexer to suppress the leaking transmission signal.

15 Claims, 8 Drawing Sheets

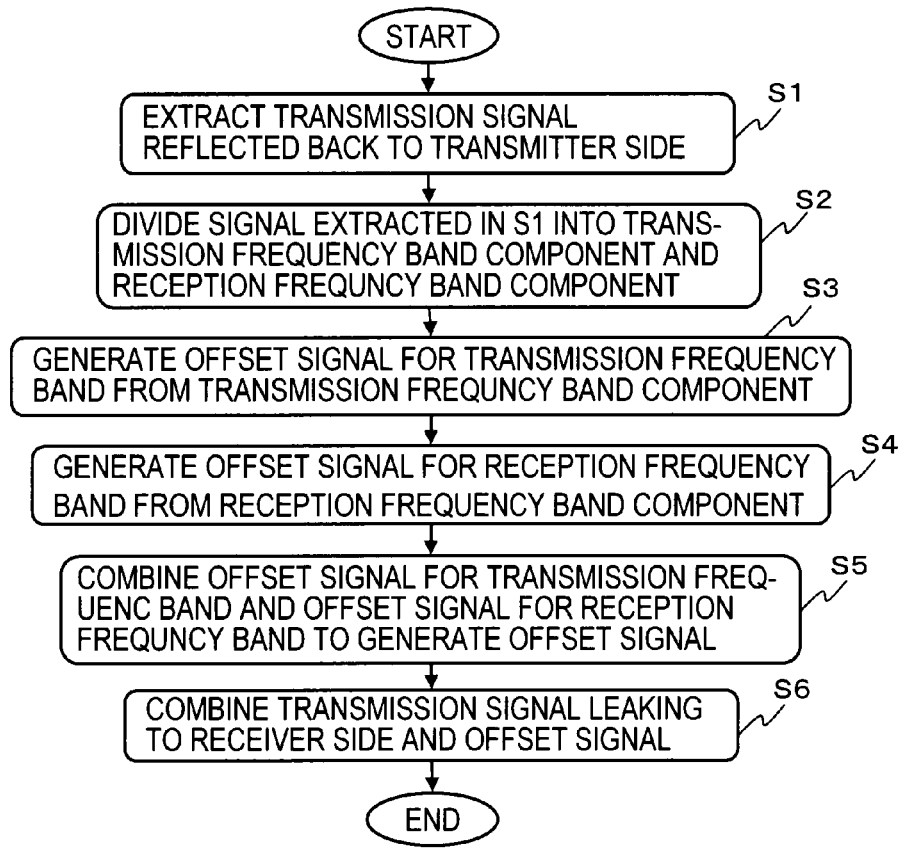
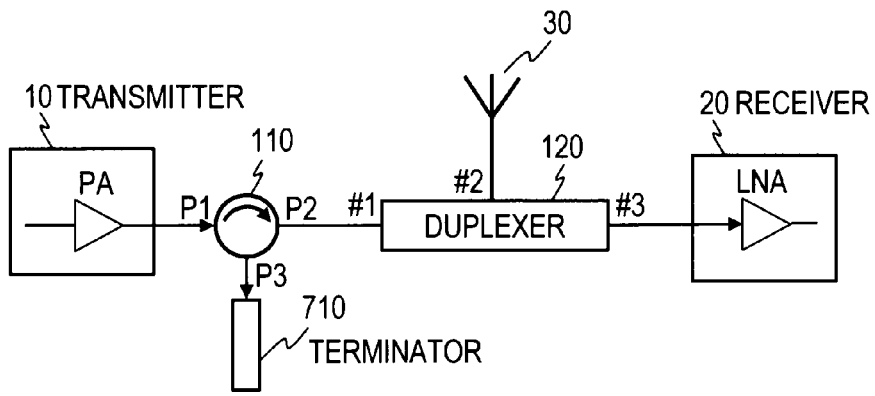

LEAKAGE POWER REDUCTION APPARATUS

BACKGROUND OF THE INVENTION

1. Field of the Invention

The present invention relates to apparatuses for reducing power leaking from a transmitter side to a receiver side, for use in communication equipment which performs communication by allocating two frequencies in adjacent frequency bands to transmission and reception.

2. Description of the Related Art

In communication equipment which performs communication by allocating two frequencies in adjacent frequency bands to transmission (transmission frequency f1) and reception (reception frequency f2), a duplexer is provided to use an antenna for both transmission and reception, as shown in FIG. 14.

The structure shown in FIG. 14 will be described. A transmitter 10 includes a power amplifier (PA) and outputs a transmission signal. A receiver 20 includes a low-noise amplifier (LNA) and detects a desired signal. An antenna 30 emits the transmission signal in the form of a radio wave into space and also catches a desired reception signal out of radio waves coming from space. A circulator 110 is inserted to protect the power amplifier PA from damage caused by part of the transmission power being reflected back to the output side of the transmitter by the antenna 30 or the like. The circulator has three ports having nonreciprocal properties: The power input from a first port P1 is transmitted to a second port P2, ideally without loss, and the power input from the second port P2 is transmitted not to the first port P1, but to a third port P3, ideally without loss.

A duplexer 120 has three terminals, and its internal structure is as shown in FIG. 15. The duplexer 120 includes a transmission band-pass filter 121 (BPF 1) which allows a signal in the transmission frequency band to pass through it with a small loss and which sufficiently suppresses a signal in the reception frequency band, and a reception band-pass filter 122 (BPF 2) which allows a signal in the reception frequency band to pass through it with a small loss and which sufficiently suppresses a signal in the transmission frequency band. The signal in the transmission frequency band can go between a first terminal #1 and a second terminal #2, but the signal in the reception frequency band is suppressed there. The signal in the reception frequency band can go between the second terminal #2 and a third terminal #3, but the signal in the transmission frequency band is suppressed there. The signals in the transmission frequency band and the reception frequency band are both suppressed between the first terminal #1 and the third terminal #3. The transmitter 10 is connected to the first terminal #1 through the circulator 110, the antenna 30 is connected to the second terminal #2, and the receiver 20 is connected to the third terminal #3. Ideally, the transmission signal in the transmission frequency band sent from the transmitter 10 is input to the first terminal #1 and output through the second terminal #2 to the antenna 30; and the reception signal in the reception frequency band received by the antenna 30 is input to the second terminal #2 and output through the third terminal #3 to the receiver 20. A terminator 710 is usually a 50-ohm resistor which absorbs the signal output to the third port P3 of the circulator 110 (consumes the current by converting it to heat).

With that structure, the transmission signal is sent to the antenna 30 with a small loss and is emitted in the form of radio waves into space. Part of the power of the transmission signal is reflected back to the duplexer 120 because of the reflection characteristics of the antenna 30 and passes through the BPF 1 with a small loss. The reflected signal reaches the circulator 110, and then it is transmitted to the third port P3 and absorbed by the terminator 710. Therefore, the reflected signal will not adversely affect the PA in the transmitter 10.

The power of the transmission signal reflected by the antenna 30 is transmitted also to the BPF 2, and most of the power is suppressed by the BPF 2. However, a very small part of the reflected power leaks to the receiver side. If the power of the signal input to the antenna 30 is large and if the absolute value of the reflected power is large accordingly, the leakage power to the receiver side may cause distortion in the LNA.

The same problem occurs between the terminals #1 and #3, where the duplexer 120 is connected to the transmitter and the receiver, because a part of the power of the transmission signal leaks to the receiver side.

The simplest way to solve the problem caused by the power of the transmission signal leaking to the receiver side would be to improve the out-of-band suppression characteristics of the BPF 1 and BPF 2 included in the duplexer 120 or to lower the degree of coupling between the terminals. However, it is very difficult to adopt this approach if the transmission frequency is close to the reception frequency.

A different solution disclosed in Japanese Patent Application Laid Open No. H2-151130 uses a leakage power reduction apparatus 800 structured as shown in FIG. 16. The leakage power reduction apparatus 800 includes a divider 810, a circulator 820, a level adjuster 830, a phase shifter 840, and a combiner 140. The divider 810 divides the power of the transmission signal input from the transmitter 10 into two parts. The circulator 820 has nonreciprocal properties: The power input from a first port P1 is transmitted to a second port P2, ideally without loss; and the power input from the second port is transmitted not to the first port, but to a third port P3, ideally without loss. The divider 810 is connected to the first port, the antenna 30 is connected to the second port, and the combiner 140 is connected to the third port. The level adjuster 830 adjusts the amplitude of the signal input from the divider 810 and outputs the adjusted signal to the phase shifter 840. The phase shifter 840 adjusts the phase of the signal input from the level adjuster 830 and gives the adjusted signal to the combiner 140. The combiner 140 is connected to the third port of the circulator 820 and to the phase shifter 840 and combines the signals input from them and gives a combined signal to the receiver 20.

The principle of operation of the apparatus will be described next. The transmission signal coming from the transmitter 10 passes through the divider 810 and the circulator 820 and is emitted from the antenna 30. Part of the power of the transmission signal would be reflected by the antenna 30 and leak to the receiver side through the third port of the circulator 820. In this apparatus, however, part of the power of the transmission signal from the transmitter 10 is extracted from the divider 810. The amplitude and phase of the extracted signal are adjusted to generate an offset signal having the same amplitude and the opposite phase with respect to the leakage signal when combined in the combiner 140. The leakage power is suppressed by combining the offset signal and the leakage signal in the combiner 140.

A different solution disclosed in the abstract of Japanese Patent Application Laid Open No. H9-116459 uses a leakage power reduction apparatus 900 structured as shown in FIG. 17. The leakage power reduction apparatus 900 includes circulators 110, 820, an amplifier 910, a phase shifter 840, and a combiner 140. The circulator 110 is the same as the one included in the structure described earlier with reference to FIG. 14. The circulator 820, the phase shifter 840, and the combiner 140 are the same as the corresponding elements included in the apparatus described earlier with reference to FIG. 16. Elements having the same functions as those shown in FIG. 14 or FIG. 16 will be given the same reference numbers in FIG. 17, and a description thereof will be omitted. Like numbering will also be used in the other drawings. The amplifier 910 amplifies a signal input from a third port of the circulator 110 and gives the amplified signal to the phase shifter 840.

The principle of operation of the apparatus will be described next. A transmission signal coming from the transmitter 10 passes through the circulator 110 and the circulator 820 and is emitted from the antenna 30. Part of the power of the transmission signal would be reflected by the antenna 30 and leak to the receiver side through a third port of the circulator 820. This apparatus, however, uses the phenomenon that a portion of the part of the power of the transmission signal reflected by the antenna 30 leaks through a second port to a first port of the circulator 820. The corresponding leakage power is extracted from the third port of the circulator 110, and the extracted signal is used to generate an offset signal. Since the power of the extracted signal is weak because of the isolation function of the circulator 820, the amplifier 910 amplifies the signal. Then, the phase is adjusted to generate an offset signal having the same amplitude and the opposite phase with respect to the leakage signal when combined in the combiner 140. The leakage power is suppressed by combining the offset signal and the leakage signal in the combiner 140.

In the solution disclosed in Japanese Patent Application Laid Open No. H2-151130, since the divider 810 extracts a part of the transmission power to generate the offset signal, the power utilization efficiency of the apparatus is lowered. The solution disclosed in the abstract of Japanese Patent Application Laid Open No. H9-116459 does not waste the transmission power, but because the weak leakage power from the circulator 110 is used, an amplifier is needed. The power consumed by the amplifier inevitably lowers the power utilization efficiency of the apparatus.

SUMMARY OF THE INVENTION

Accordingly, an object of the present invention is to provide a leakage power reduction apparatus that can suppress leakage power from the transmitter side to the receiver side without lowering the power utilization efficiency, for use in communication equipment which performs communication by allocating two frequencies in adjacent frequency bands to transmission and reception.

According to the present invention, a leakage power reduction apparatus for suppressing a leaking transmission signal leaking from a transmitter side to a receiver side, directly or through reflection by an antenna, comprises:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band; and a combiner which is configured to receive an output signal sent from the third terminal of the duplexer and the offset signal for the transmission frequency band sent from the amplitude-and-phase adjuster, and output a signal obtained by suppressing a signal in the transmission frequency band included in the output signal sent from the third terminal of the duplexer by the offset signal in the transmission frequency band.

BRIEF DESCRIPTION OF THE DRAWINGS

FIG. 13 is a flow chart of processing in the fifth embodiment;

FIG. 14 is a block diagram showing an example basic structure of communication equipment which performs communication by allocating two frequencies in adjacent frequency bands to transmission and reception;

DETAILED DESCRIPTION OF THE PREFERRED EMBODIMENTS

First Embodiment

Figure 1:
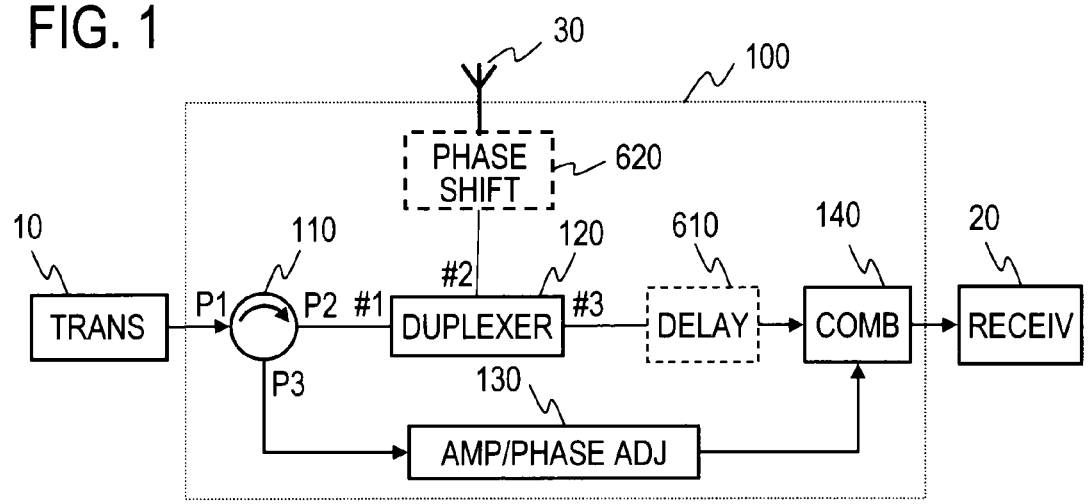
FIG. 1 is a block diagram showing an example structure of a leakage power reduction apparatus of a first embodiment.
Figure 11:
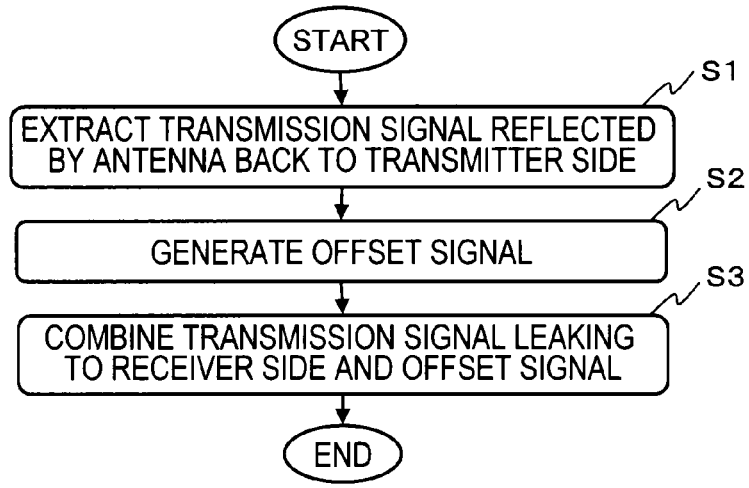
FIG. 11 is a flow chart of processing in the first embodiment.

FIG. 1 shows a functional block diagram of a leakage power reduction apparatus 100 of the present invention. FIG. 11 is a flow chart of the corresponding processing.

Figure 16:
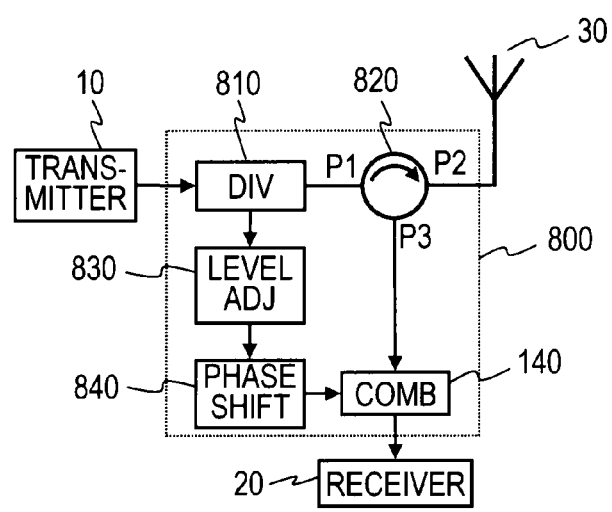
FIG. 16 is a block diagram showing a conventional leakage power reduction apparatus.
Figure 17:
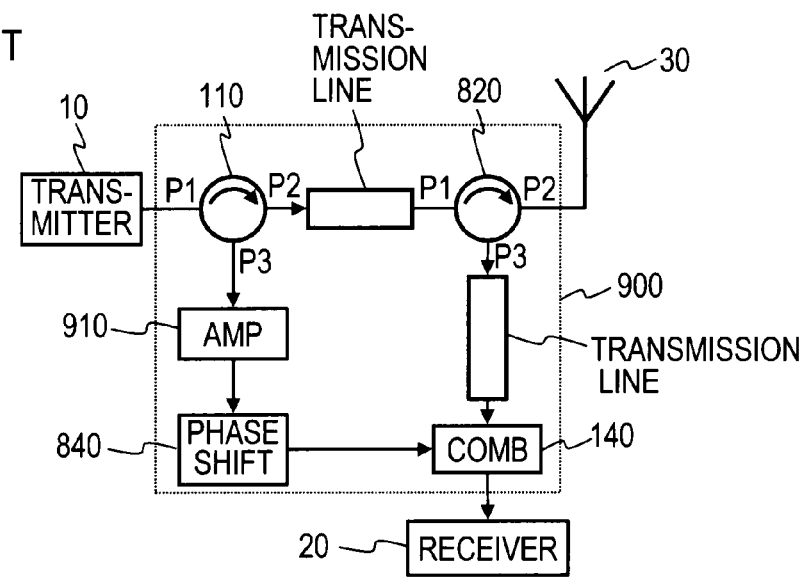
FIG. 17 is a block diagram showing another conventional leakage power reduction apparatus.

The leakage power reduction apparatus 100 of the present invention includes a circulator 110, a duplexer 120, an amplitude-and-phase adjuster 130, and a combiner 140. The circulator 110 and the duplexer 120 are the same as those included in the structure described earlier with reference to FIG. 14. The combiner 140 is the same as that included in the apparatus described earlier with reference to FIG. 16.

The amplitude-and-phase adjuster 130 is connected to a third port P3 of the circulator 110, generates an offset signal by adjusting the amplitude and phase of a signal input from the circulator 110, and gives the generated signal to the combiner 140.

The principle of operation of the first embodiment will be described next.

A transmission signal coming from a transmitter 10 passes through the circulator 110 and the duplexer 120 and is emitted from an antenna 30. Part of the power of the transmission signal is reflected back to a second terminal #2 of the duplexer 120 by the antenna 30. A portion thereof leaks to the receiver side through a third terminal #3, and the other portion goes back to the transmitter side through a first terminal #1. However, since the duplexer 120 has the properties of suppressing a signal in a transmission frequency band between the second terminal #2 and the third terminal #3 and allowing the signal to go between the second terminal #2 and the first terminal #1, the power flowing back to the transmitter side through the first terminal #1 is relatively large compared with the leakage power through the third terminal #3. In the present invention, the reflected signal through the first terminal #1 is extracted by the circulator 110 (step S1), and the amplitude-and-phase adjuster 130 adjusts the amplitude and phase of the signal to generate an offset signal having the same amplitude and the opposite phase with respect to the leakage signal from the third terminal #3 of the duplexer 120 when combined in the combiner 140 (step S2). The leakage power is suppressed by combining the offset signal and the leakage signal from the third terminal #3 of the duplexer 120 in the combiner 140 (step S3).

The leakage power reduction apparatus structured as described above does not decrease the power utilization efficiency because it does not waste part of the transmission power, unlike the structure shown in Japanese Patent Application Laid Open No. H2-151130, and because it can suppress the leakage power without inserting an amplifier, unlike the structure shown in the abstract of Japanese Patent Application Laid Open No. H9-116459.

Figure 2:
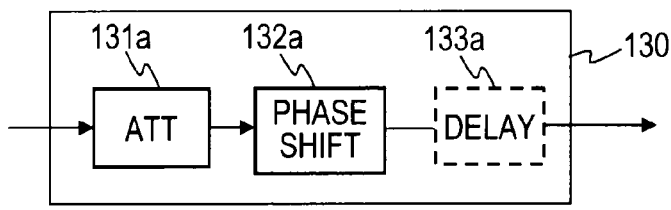
FIG. 2 is a block diagram showing an example structure of an amplitude-and-phase adjuster.

The amplitude-and-phase adjuster 130 used in the first embodiment includes an attenuator 131a, a phase shifter 132a, and a delay device 133a connected in series, as in an example structure shown in FIG. 2.

In this structure, the offset signal, having the same amplitude and the opposite phase with respect to the leakage signal when combined by the combiner 140, is generated by attenuating the amplitude of the signal input to the amplitude-and-phase adjuster 130 with the attenuator 131a and adjusting the amount of phase shift with the phase shifter 132a. If the transmission signal is a broadband modulation signal, the delay is also adjusted by the delay device 133a such that any relative delay is eliminated.

The attenuator 131a and the phase shifter 132a (and the delay device 133a) can be placed in any order.

The transmission signal input to the first terminal of the duplexer 120 leaks to the third terminal #3 not only in a reflection path from the antenna, which is from the first terminal #1 of the duplexer 120, through the second terminal #2, the antenna 30, and the second terminal #2, to the third terminal #3, but also in a direct path formed by terminal coupling, which is from the first terminal #1 to the third terminal #3 of the duplexer 120. The leakage signals in these two paths have different amplitudes and different phases (and different amounts of delay). If the attenuator and the phase shifter (and the delay device) are used for both leakage signals in the two paths, the amounts of attenuation and phase shift (and delay) should be set by making some compromises, and therefore, the most suitable offset signals cannot be generated for both paths.

Figure 3:
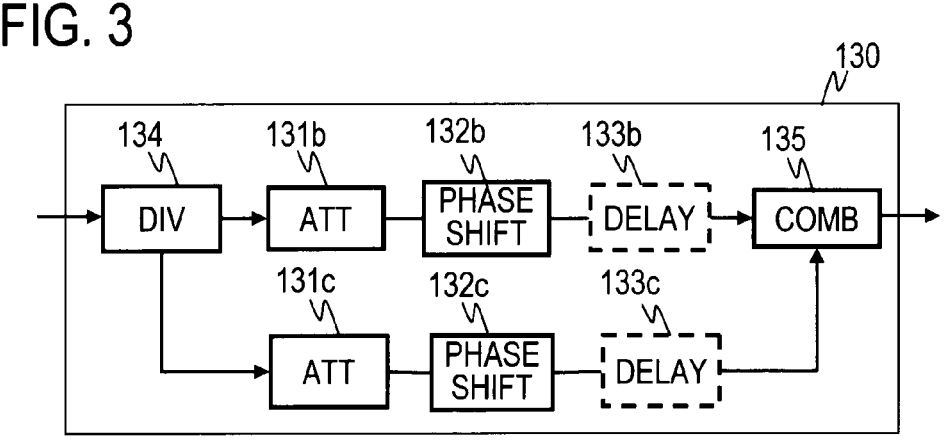
FIG. 3 is a block diagram showing another example structure of the amplitude-and-phase adjuster.

Accordingly, the amplitude-and-phase adjuster 130 may be structured as shown in FIG. 3: A divider 134 divides the input signal into two parts; an attenuator 131b and a phase shifter 132b (and a delay device 133b) generate an offset signal for the leakage signal in the reflection path, while an attenuator 131c and a phase shifter 132c (and a delay device 133c) generate an offset signal for the leakage signal in the direct path; and a combiner 135 combines the two offset signals. With this structure, offset signals having amplitudes and phases corresponding to the leakage signals in the reflection path and the direct path can be generated. If there is a further path for leakage signal besides the reflection path and the direct path, the signal input to the amplitude-and-phase adjuster 130 may be divided into a corresponding number of parts, and offset signals corresponding to the individual leakage signals may be generated and combined.

The impedance of the antenna can vary depending on the installation environment or the ambient environment of the antenna, and any change in impedance will change the phase or amplitude of the reflection signal. Accordingly, if the settings of the attenuator and the phase shifter (and the delay device) are fixed, the leakage power may not be reduced sufficiently. To prevent this, a variable attenuator and a variable phase shifter (and a variable delay device) can be used as the attenuators 131a, 131b, 131c and the phase shifters 132a, 132b, 132c (and the delay devices 133a, 133b, 133c) of the amplitude-and-phase adjuster 130 shown in FIG. 2 or 3.

Figure 4:
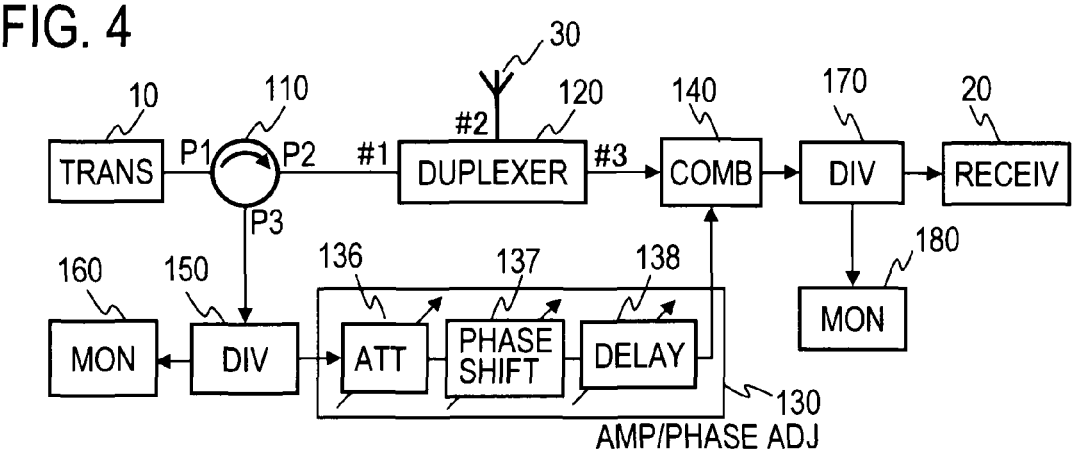
FIG. 4 is a block diagram showing an example structure of the first embodiment when variable units are included.

FIG. 4 shows an example structure using a variable attenuator 136, a variable phase shifter 137, and a variable delay device 138. A divider 150 is disposed upstream of the amplitude-and-phase adjuster 130 such that the variable attenuator 136, the variable phase shifter 137, and the variable delay device 138 can be adjusted appropriately in accordance with the state of a signal input to the amplitude-and-phase adjuster 130; the state is displayed on a monitor 160. A divider 170 is also disposed upstream of the receiver 20 such that the state of the signal input to the receiver 20 can be checked; the state is displayed on a monitor 180. The operator can adjust the attenuator 136, the phase shifter 137, and the delay device 138 to minimize the leakage signal while observing the state on the monitor 180.

Second Embodiment

Figure 5:
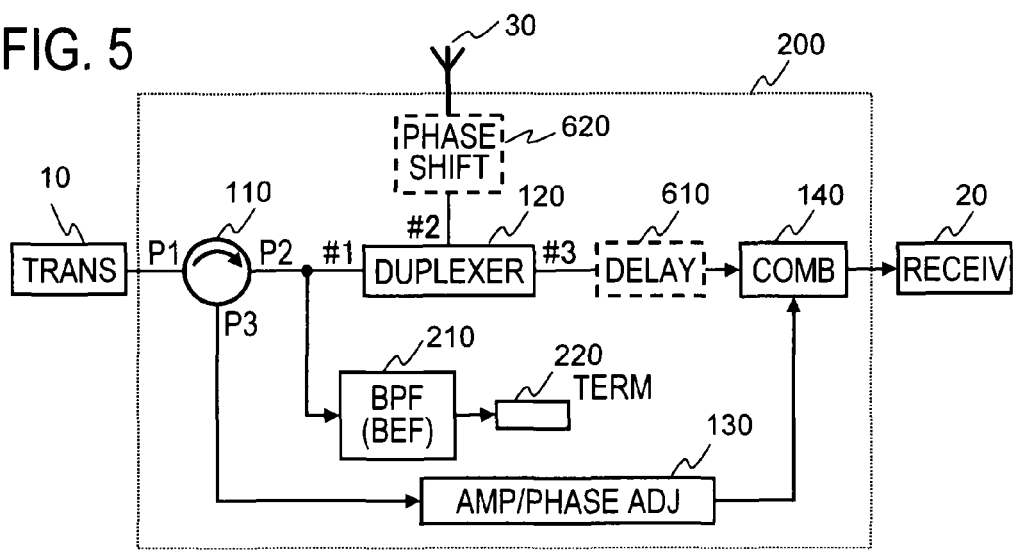
FIG. 5 is a block diagram showing an example structure of a leakage power reduction apparatus of a second embodiment.

FIG. 5 is a functional block diagram showing an example structure of a leakage power reduction apparatus 200 of a second embodiment of the present invention.

Figure 6:
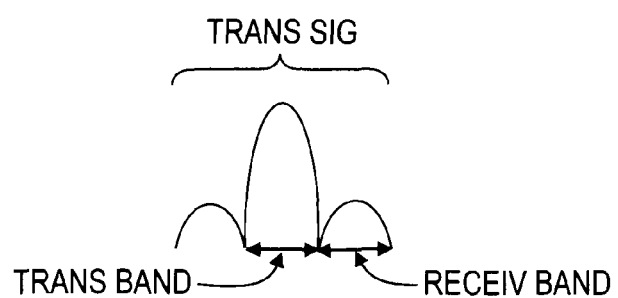
FIG. 6 is a conceptual diagram of the spectrum of a transmission signal.
Figure 15:
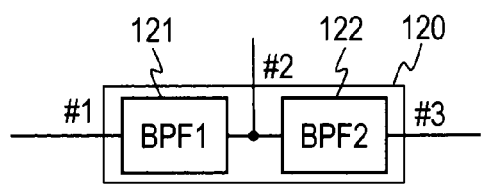
FIG. 15 is a block diagram showing an example structure of a duplexer.

The transmission signal from the transmitter 10 is usually a modulation signal and generally contains not only a component of the transmission frequency band but a component of the reception frequency band as distortion, as shown in FIG. 6. If the transmission signal contains a reception frequency band component, the structure of the first embodiment can prevent a transmission frequency band component of the transmission signal from leaking to the side of the receiver 20, as described earlier. However, a large part of the power of the reception frequency band component of the transmission signal input to the first terminal #1 of the duplexer 120 is rejected by the transmission band-pass filter 121 (see FIG. 15) in the duplexer 120. If the rejected signal passes through the circulator 110, the amplitude-and-phase adjuster 130, and the combiner 140 to reach the receiver 20, it will interfere with a desired reception signal and can degrade the reception performance.

Therefore, the second embodiment is structured by adding a reception band-pass filter 210 (BPF) and a terminator 220 to the structure of the first embodiment shown in FIG. 1. A circulator 110, a duplexer 120, an amplitude-and-phase adjuster 130, and a combiner 140 in the second embodiment have the same functions as those corresponding elements in the first embodiment.

One end of the reception band-pass filter 210 (BPF) is connected to a junction between the second port P2 of the circulator 110 and the first terminal #1 of the duplexer 120, and the other end is connected to the terminator 220. The reception band-pass filter 210 (BPF) rejects all components of the input signal other than the reception frequency band component. The terminator 220 is usually a 50-ohm resistor which absorbs the signal input from the other end of the reception band-pass filter 210 (BPF) (consumes the current by converting it to heat).

In this structure, most of the reception frequency band component of the transmission signal coming from the transmitter goes not into the first terminal #1 of the duplexer 120, but into the reception band-pass filter 210 because of a difference in input impedance. The absolute amount of the reception frequency band component reflected by the duplexer 120 is suppressed, the signal going into the reception band-pass filter 210 is absorbed by the terminator 220, and consequently, the absolute amount of the interference signal reaching the receiver side through the amplitude-and-phase adjuster 130 or the like can be suppressed.

The same effect can be obtained by replacing the reception band-pass filter 210 (BPF) with a transmission band-elimination filter (BEF), which rejects the transmission frequency band component of the input signal and allows the remaining component to pass through it.

Third Embodiment

Figure 7:
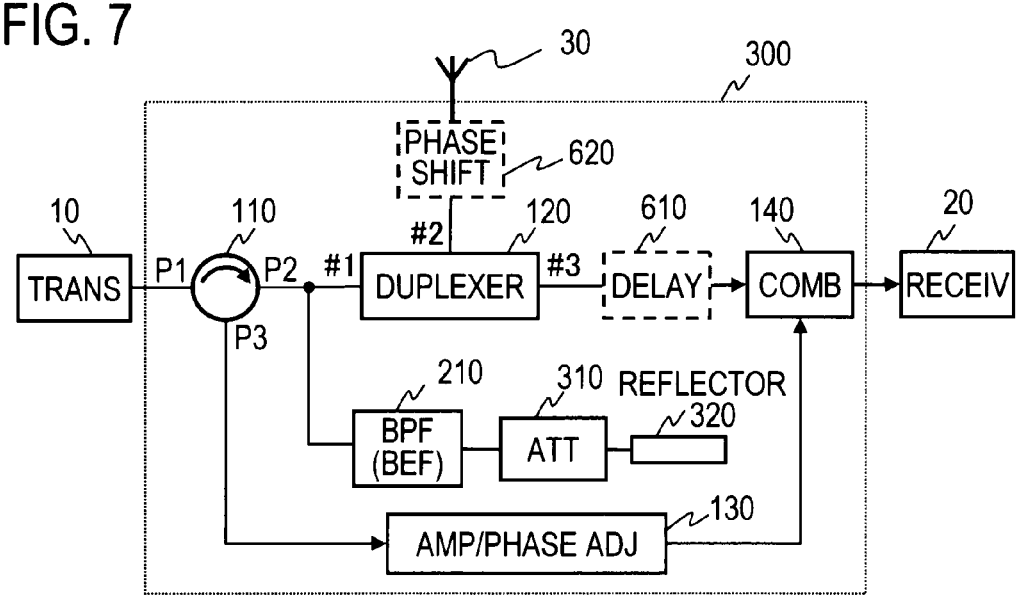
FIG. 7 is a block diagram showing an example structure of a leakage power reduction apparatus of a third embodiment.

FIG. 7 is a functional block diagram showing an example structure of a leakage power reduction apparatus 300 of a third embodiment of the present invention.

The third embodiment is structured by disposing an attenuator 310 and a reflector 320 instead of the terminator 220 in the structure of the second embodiment shown in FIG. 5. A circulator 110, a duplexer 120, an amplitude-and-phase adjuster 130, a combiner 140, and a reception band-pass filter 210 (BPF) have the same function as those corresponding elements used in the second embodiment.

The attenuator 310 is connected between the reception band-pass filter 210 (BPF) and the reflector 320 and attenuates the amplitude of an input signal. The reflector 320 is a transmission line having a certain length with an open end or a short-circuited end and reflects a signal input from the attenuator 310 back to the attenuator 310 again, adding a predetermined phase difference.

Most of the power of the reception frequency band component of the transmission signal flows into the reception band-pass filter 210, as has been explained in the description of the second embodiment. A small part of the power passes through the duplexer 120 and flows through the third terminal #3 thereof to the receiver side. This leakage signal will interfere with a desired reception signal and can degrade the reception performance.

In the third embodiment, the leakage signal is suppressed by using the reception frequency band component of the transmission signal as a source for generating an offset signal for canceling out the leakage signal in the reception frequency band outputted from the third terminal #3 of the duplexer 120. For this purpose, the reception frequency band component of the transmission signal having passed through the reception band-pass filter 210 is not terminated unlike in the second embodiment.

To be more specific, the reception frequency band component of the transmission signal which is input from the transmitter side and passes through the reception band-pass filter 210 goes through the downstream attenuator 310 and is reflected by the reflector 320. The reflected signal passes through the attenuator 310, the reception band-pass filter 210, the circulator 110, and the amplitude-and-phase adjuster 130 to reach the combiner 140. The attenuator 310 and the reflector 320 in that path adjust the amplitude and the phase, respectively, of the signal input to the combiner 140 to generate an offset signal having the same amplitude and the opposite phase, when combined in the combiner 140, with respect to the leakage signal in the reception frequency band coming from the third terminal #3 of the duplexer 120. Then, the combiner 140 can suppress the leakage signal of the reception frequency band component of the transmission signal from the duplexer 120.

Like the second embodiment, the third embodiment can produce the same effect by replacing the reception band-pass filter 210 (BPF) with a transmission band-elimination filter (BEF) for eliminating the transmission frequency band component of the input signal and allowing the remaining components to pass through it.

Fourth Embodiment

Figure 8:
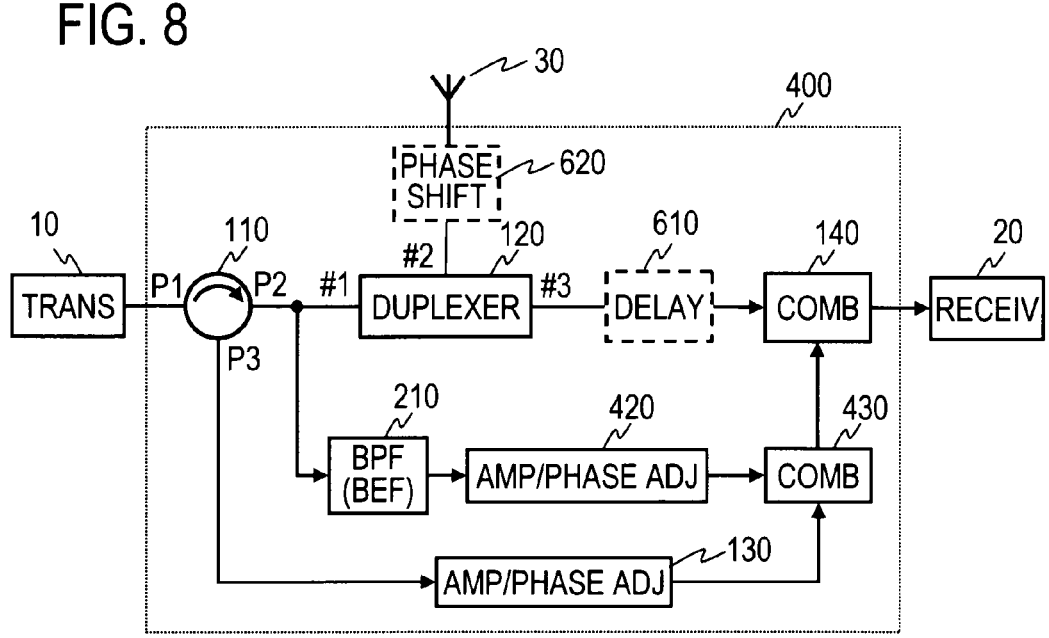
FIG. 8 is a block diagram showing an example structure of a leakage power reduction apparatus of a fourth embodiment.
Figure 12:
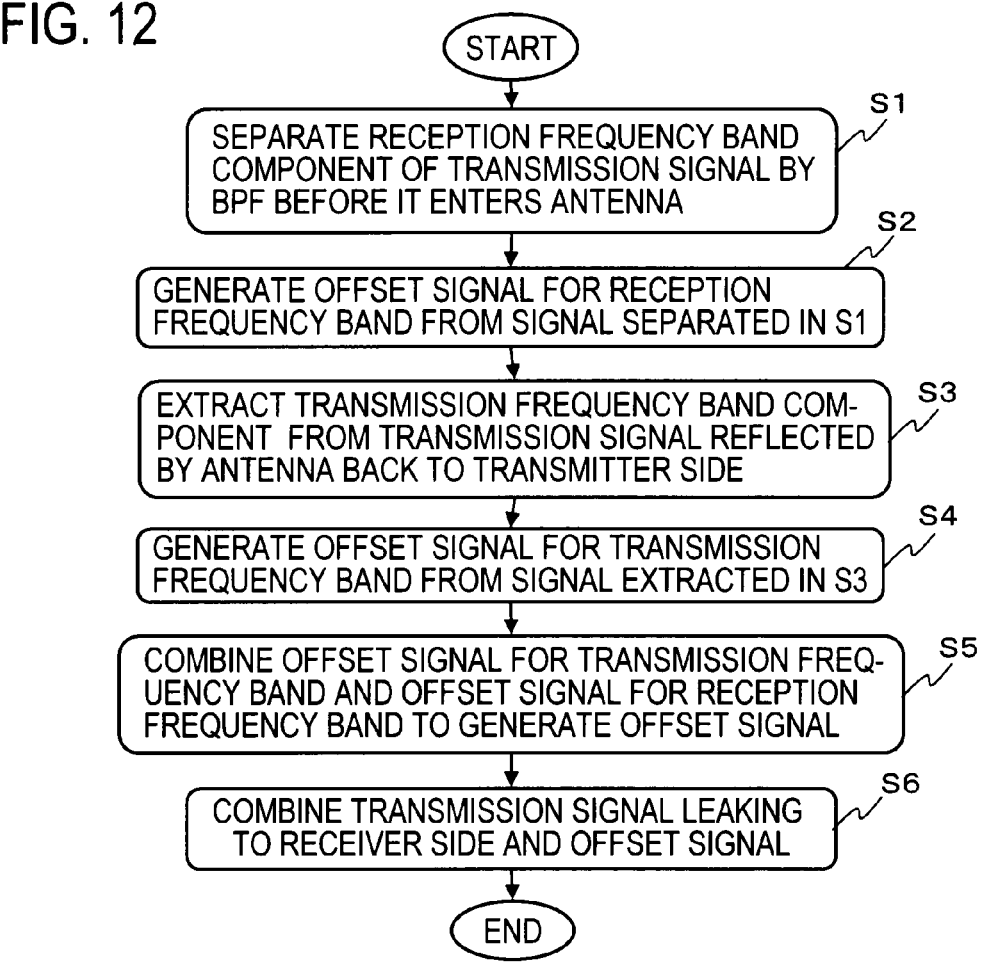
FIG. 12 is a flow chart of processing in the fourth embodiment.

FIG. 8 is a functional block diagram showing an example structure of a leakage power reduction apparatus 400 of a fourth embodiment of the present invention. FIG. 12 is a flow chart of the corresponding signal processing.

The leakage power reduction apparatus 400 of the present invention differs from the apparatus of the third embodiment, shown in FIG. 7, in that a second amplitude-and-phase adjuster 420 and a second combiner 430 are provided instead of the attenuator 310 and the reflector 320. One end of the second amplitude-and-phase adjuster 420 is connected to the terminal of a reception band-pass filter 210 (BPF) on the opposite side of a circulator 110. The combiner 430 combines the output from the other end of the second amplitude-and-phase adjuster 420 and the output from an amplitude-and-phase adjuster 130 and gives the result of combination to a combiner 140.

The circulator 110, a duplexer 120, and the reception band-pass filter 210 (BPF) have the same functions as those corresponding components used in the third embodiment. The amplitude-and-phase adjuster 130 and the combiner 140 are also the same as the amplitude-and-phase adjuster 130 and the combiner 140 used in the third embodiment. A description of the functions of those elements will be omitted.

In the third embodiment described earlier with reference to FIG. 7, the attenuator 310 and the reflector 320 adjust the amplitude and phase of the reception frequency band component of the transmission signal going to the side of the reception band-pass filter 210, in order to generate an offset signal for canceling out the reception frequency band component of the leaking transmission signal included in the output signal sent from the third terminal of the duplexer, in the combiner 140. In contrast, in the fourth embodiment, shown in FIG. 8, the second amplitude-and-phase adjuster 420 adjusts the amplitude and phase of the reception frequency band component of the transmission signal coming from the reception band-pass filter 210 and gives the adjusted signal to the combiner 140 through the second combiner 430, so that the reception frequency band component of the transmission signal from the duplexer 120 is cancelled out.

To be more specific, the transmission signal from the transmitter passes through the circulator 110. Part of the power of the transmission signal passes through the duplexer 120 and leaks directly to the receiver side, and some other part of the power of the transmission signal is reflected by the antenna 30 and leaks to the receiver side through the third terminal #3 of the duplexer 120. This means that the leakage signal contains both the transmission frequency band component and the reception frequency band component of the transmission signal.

Most of the power of the reception frequency band component of the transmission signal output from the second port P2 of the circulator 110 flows into the reception band-pass filter 210 (step S1). The output of the reception band-pass filter 210 (BPF) is given to the second amplitude-and-phase adjuster 420, where the amplitude and phase are adjusted to generate an offset signal (offset signal for the reception frequency band) such that the reception frequency band component of the leaking transmission signal included in the output signal sent from the third terminal #3 of the duplexer 120 is cancelled out in the combiner 140 (step S2).

Most of the power of the transmission frequency band component of the transmission signal passes through the duplexer 120 and is emitted from the antenna 30. Part of the power is reflected back by the antenna 30 and extracted from the third port P3 of the circulator 110 (step S3). The reflected transmission frequency band component enters the amplitude-and-phase adjuster 130, where the amplitude and phase are adjusted to provide an offset signal (offset signal for the transmission frequency band) such that the transmission frequency band component of the leaking transmission signal included in the output signal sent from the third terminal #3 of the duplexer 120 is cancelled out in the combiner 140 (step S4).

The combiner 430 combines the offset signal for the reception frequency band coming from the second amplitude-and-phase adjuster 420 and the offset signal for the transmission frequency band coming from the amplitude-and-phase adjuster 130 (step S5). The two frequency band components of the leakage signal are suppressed by combining the combined offset signal with the leakage signal from the third terminal #3 of the duplexer 120 in the combiner 140 (step S6).

Like the amplitude-and-phase adjuster 130 of the first embodiment, the amplitude-and-phase adjuster 130 and the second amplitude-and-phase adjuster 420 can have the internal structure shown in FIG. 2 or FIG. 3. If the structure shown in FIG. 3 is used, offset signals can be generated in accordance with the amplitude and phase of the leakage signals in the reflection path from the antenna 30 and the direct path of the duplexer 120. If a variable attenuator, a variable phase shifter, and a variable delay device are used in the structure shown in FIG. 2 or FIG. 3, the settings can be varied in response to a change in the environment, and a stable leakage power reduction effect can be obtained.

Like the third embodiment, the fourth embodiment can produce the same effect by replacing the reception band-pass filter 210 (BPF) with a transmission band-elimination filter (BEF) for eliminating the transmission frequency band component of an input signal and allowing the remaining components to pass through it.

Fifth Embodiment

Figure 9:
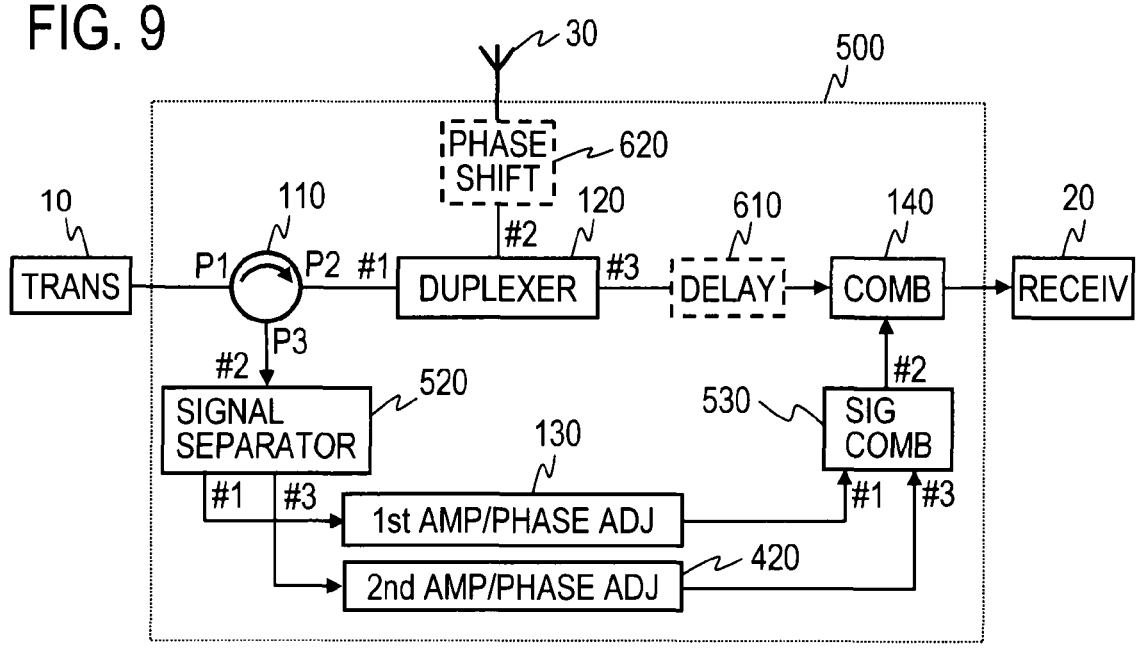
FIG. 9 is a block diagram showing an example structure of a leakage power reduction apparatus of a fifth embodiment.

FIG. 9 is a functional block diagram showing an example structure of a leakage power reduction apparatus 500 of the present invention. FIG. 13 is a flow chart of the corresponding processing. The embodiment shown in FIG. 9 is a modification of the embodiment shown in FIG. 8. In FIG. 8, the reception band-pass filter 210 extracts the reception frequency band component from the transmission signal output from the second port P2 of the circulator 110, and an offset signal for the leakage signal in the reception frequency band is generated. However, if the reception band-pass filter 210 is not provided, most of the power of the reception frequency band component of the transmission signal is reflected by the duplexer 120, or more specifically, by the transmission band-pass filter 121 in the duplexer 120 (see FIG. 15), and the reflected power is sent from the second port P2 to the third port P3 in the circulator 110. In the embodiment shown in FIG. 9, a signal separator 520 is connected to the third port P3 of a circulator 110, and separates the output from the third port P3 into a transmission frequency band component of the transmission signal reflected from the antenna 30 and a reception frequency band component reflected by the duplexer 120. A signal combiner 530 combines the separated components supplied through the amplitude-and-phase adjuster 130 and the amplitude-and-phase adjuster 420 and gives a combined signal to the combiner 140.

The leakage power reduction apparatus 500 of the fifth embodiment includes the circulator 110, the duplexer 120, the signal separator 520, the amplitude-and-phase adjusters 130 and 420, the signal combiner 530, and the combiner 140. The circulator 110, the duplexer 120, the amplitude-and-phase adjusters 130 and 420, and the combiner 140 are the same as those used in the fourth embodiment. Each of the signal separator 520 and the signal combiner 530 has the same structure as the duplexer 120, which is the same as that shown in FIG. 15. The signal separator 520 separates the transmission signal reflected from the antenna 30 into a transmission frequency band component and a reception frequency band component. The signal combiner 530 combines the transmission frequency band component after the adjustment of amplitude and phase (transmission frequency band offset signal) and the reception frequency band component after the adjustment of amplitude and phase (reception frequency band offset signal).

In the fourth embodiment, the signal extracted by the reception band-pass filter 210 connected to the second port P2 of the circulator 110 is used as the source for generating the offset signal for the reception frequency band component of the transmission signal leaking from the third terminal #3 of the duplexer 120. In the fifth embodiment, the signal reflected by the transmission band-pass filter 121 (BPF) in the duplexer 120 and sent from the second port P2 to the third port P3 in the circulator 110 is used.

To be more specific, the transmission signal coming from the transmitter 10 passes through the circulator 110. Part of the signal leaks to the side of the receiver 20 directly through the duplexer 120, and some other part of the signal is reflected by the antenna 30 and leaks to the side of the receiver 20 through the third terminal #3 of the duplexer 120.

At the same time, while part of the transmission frequency band component of the transmission signal is reflected by the antenna 30, part of the reception frequency band component is rejected by the reception band-pass filter 121 in the duplexer 120. Those two parts are input to the second port P2 of the circulator 110 again and output from the third port P3 (step S1). The output signal is input to the second terminal #2 of the signal separator 520 and separated into a transmission frequency band component and a reception frequency band component, which are output from the first terminal #1 and the third terminal #3, respectively, and are given to the amplitude-and-phase adjusters 130 and 420, respectively (step S2). The amplitudes and phases of the input signals are adjusted by the corresponding amplitude-and-phase adjusters, and an offset signal for the transmission frequency band component (transmission frequency band offset signal) and an offset signal for the reception frequency band component (reception frequency band offset signal) of the leaking transmission signal included in the output signal sent from the third terminal #3 of the duplexer 120 are generated (steps S3 and S4). The generated offset signals are input to the first terminal #1 and the third terminal #3 of the signal combiner 530, respectively, and an effectively combined offset signal is output from the second terminal #2 (step S5). The combiner 140 suppresses the leakage signals by combining the combined offset signal and the leakage signals from the third terminal #3 of the duplexer 120 (step S6).

Modified Embodiment

In the structures of the first to fifth embodiments, a delay device 610 may be disposed between the duplexer 120 and the combiner 140, as indicated by a broken line. With this delay device 610, the relative difference in delay between the leakage signal and the offset signal can be eliminated more flexibly and more precisely.

A phase shifter 620 may be disposed between the duplexer 120 and the antenna 30, as indicated by a broken line. The total amplitude of the leakage signal can be reduced by performing phase adjustment such that the signal leaking directly from the first terminal #1 to the third terminal #3 of the duplexer 120 and the signal leaking from the first terminal #1 to the third terminal #3 via the reflection by the antenna 30 have opposite phases. Accordingly, the amount of amplitude adjustment to be made by the amplitude-and-phase adjusters 130 and 420 can be reduced. If there is a difference in relative delay, an additional delay device may be used.

Either the delay device 610 or the phase shifter 620, or both of them, may be provided. The devices produce independent effects.

[Example of Leakage Power Reduction]

Figure 10:
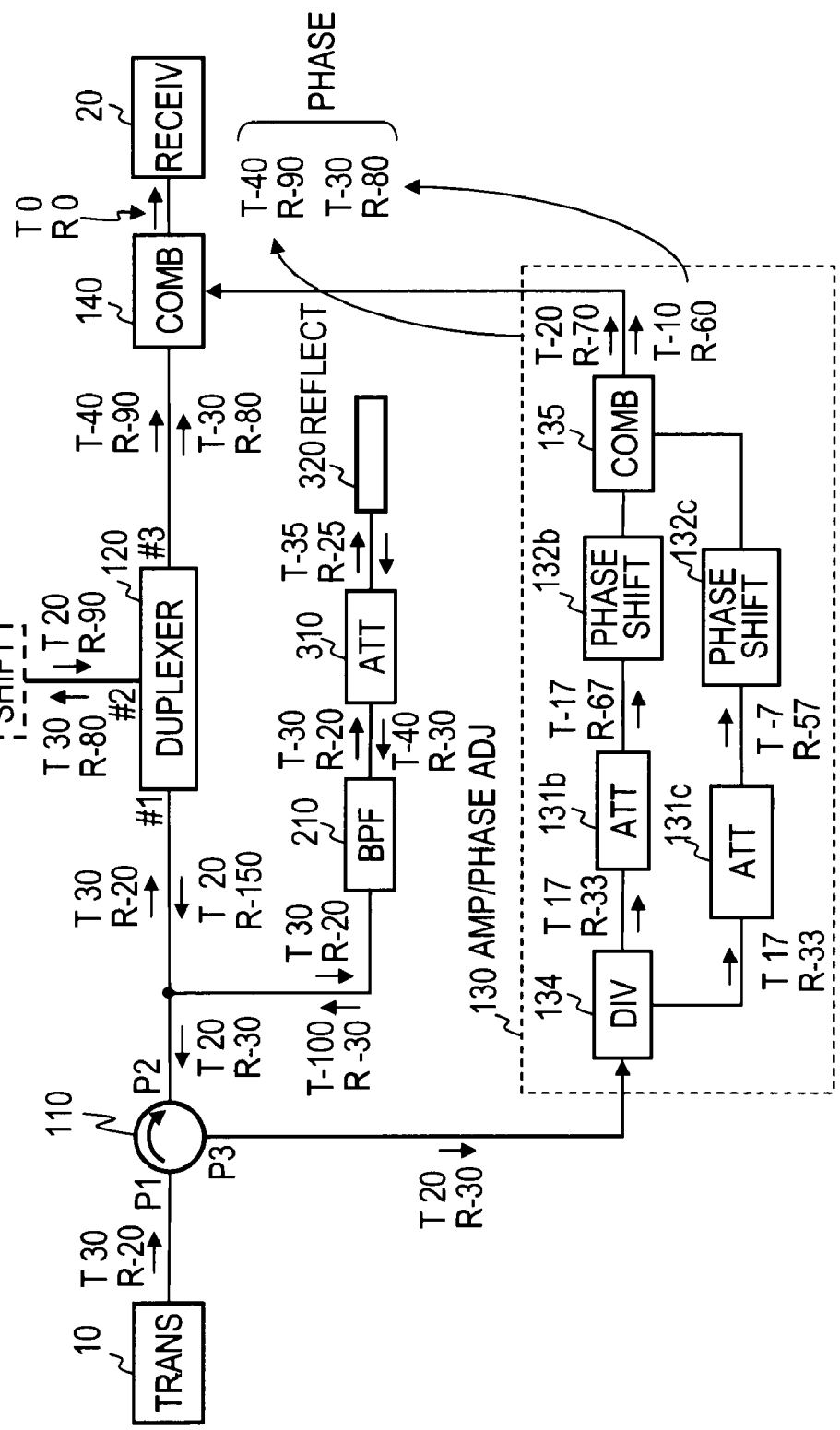
FIG. 10 is a block diagram of a leakage power reduction apparatus, showing an example of leakage power reduction.

An example structure designed to cancel out a power leak of a signal sent from the transmitter 10, upstream of the receiver 20 when the leak occurs at the side of the receiver 20, will be described with reference to FIG. 10. The structure shown in FIG. 10 uses the structure of the third embodiment with an amplitude-and-phase adjuster 130 configured as shown in FIG. 3, but the delay devices 133b and 133c are not used. The following are assumed as preconditions.

Preconditions (a) The transmission signal from the transmitter 10 contains a transmission frequency band component having a power level of 30 dBm and a reception frequency band component having a power level of −20 dBm (see FIG. 6).
(b) In a circulator 110, the signal goes from the first port P1 to the second port P2 and from the second port P2 to the third port P3 without loss.
(c) The duplexer 120 and the BPF 210 allow a signal in the pass bands to pass through them without loss and give an insertion loss of 60 dB to any other signals.
(d) The return loss of the antenna is 10 dB.
(e) The dividing loss of the divider 134 and the coupling loss of the combiner 135 are both 3 dB. The coupling loss of the combiner 140 is 0 dB for a leakage signal and 20 dB for an offset signal.

An example will be described. In FIG. 10, each arrow represents the direction of transmission of the transmission signal. The power levels of the transmission frequency band component and the reception frequency band component of the transmission signal are indicated by numerals following the characters T and R, respectively, in units of dBm.

The transmission signal sent from the transmitter 10 passes through the circulator 110 and is input to the duplexer 120 and the BPF 210.

The signal reaching the antenna 30 through the duplexer 120 is attenuated by 10 dB and reflected. Since the reception frequency band component of the signal has already been attenuated by 60 dB when it travels from the first terminal #1 to the second terminal #2 in the duplexer 120, the transmission signal reflected by the antenna 30 contains a transmission frequency band component having a power level of 20 dBm and a reception frequency band component having a power level of −90 dBm.

When the return signal is input to the second terminal #2 of the duplexer 120 again, the transmission frequency band component having a power level of 20 dBm and the reception frequency band component having a power level of −150 dBm return from the first terminal #1 to the transmitter side. In addition, a transmission frequency band component having a power level of −40 dBm and a reception frequency band component having a power level of −90 dBm leak from the third terminal #3 of the duplexer 120 to the receiver side.

When the transmission signal is input to the first terminal #1 of the duplexer 120, the power is attenuated by 60 dB by the duplexer 120, and a transmission frequency band component having a power level of −30 dBm and a reception frequency band component having a power level of −80 dBm leak directly from the third terminal #3 to the receiver side, besides the power returning from the antenna. Here, it is assumed that the reception frequency band component leaked from the second terminal #2 of the duplexer 120 to the third terminal #3 and the reception frequency band component leaked from the first terminal #1 directly to the third terminal #3 are substantially in phase with each other at the output of the third terminal #3.

The transmission signal input to the BPF 210 returns with an attenuation of 10 dB in total by the attenuator 310 (a method for determining the amount of attenuation will be described later) and with the transmission frequency band component attenuated by 120 dB in total by the BPF 210. A transmission frequency band component having a power level of −100 dBm and a reception frequency band component having a power level of −30 dBm return to the transmitter side.

Leakage power is suppressed by generating offset signals for canceling out the power leaking by way of reflection from the antenna 30 and power leaking directly through the duplexer 120, using the power returning from the duplexer 120 to the side of the transmitter 10.

The power returning from the duplexer 120 to the side of the transmitter 10 contains components reflected by the antenna 30 and components reflected by the reflector 320. The transmission frequency band component predominantly includes a component reflected by the antenna 30, and the reception frequency band component predominantly includes a component reflected by the reflector 320. Therefore, the returning power used to generate the offset signals contains the transmission frequency band component having a power level of 20 dBm and the reception frequency band component having a power level of −30 dBm.

The returning power passes through the circulator 110 and enters the amplitude-and-phase adjuster 130, where the divider 134 divides the power into two parts. An offset signal for leakage power due to reflection by the antenna 30 and an offset signal for direct leakage power are generated.

Attenuators 131*b* and 131*c* adjust the amplitudes. The attenuation setting of each attenuator is determined to provide the same amplitude as the transmission frequency band component of the corresponding leakage signal when combined by the combiner 140. In this example, the attenuator 131*b* provides an attenuation of 34 dB, and the attenuator 131*c* provides an attenuation of 24 dB. With these settings, the attenuator 310 is adjusted to provide the same amplitude as the reception frequency band component of the leakage signal when combined in the combiner 140. In this example, the attenuator 310 provides an attenuation of 5 dB.

As a result, the output from the attenuator 131*b* contains a transmission frequency band component having a power level of −17 dBm and a reception frequency band component having a power level of −67 dBm, and the output from the attenuator 131*c* contains a transmission frequency band component having a power level of −7 dBm and a reception frequency band component having a power level of −57 dBm.

Phase shifters 132*b* and 132*c* adjust the phases to provide the opposite phases to those of the leakage power caused by reflection from the antenna 30 and the direct leakage power, so that the offset signal for the leakage power caused by reflection from the antenna 30 and the offset signal for the direct leakage power are generated. These are combined by the combiner 135.

Because a coupling loss of 20 dB for the offset signals by the combiner 140 has been taken into consideration, as described in the precondition (e), the power of the combined signal is 20 dB greater than the leakage power. (The offset signal for the leakage power caused by reflection from the antenna 30 contains a transmission frequency band component having a power level of −20 dBm and a reception frequency band component having a power level of −70 dBm, and the offset signal for the direct leakage power contains a transmission frequency band component having a power level of −10 dBm and a reception frequency band component having a power level of −60 dBm.)

The combiner 140 combines the leakage signals and the offset signals, and consequently the transmission frequency band component and the reception frequency band component can be eliminated upstream of the receiver 20. In the case where the phase difference between the reception frequency band component leaked from the second terminal #2 to the third terminal #3 and the one leaked from the first terminal #1 directly to the third terminal #3 cannot be ignored, it is possible to arrange such that a phase shifter 620 is inserted between the antenna 30 and the duplexer 120 as shown in a broken line in FIG. 10 and the amount of phase shift is set so that the two leaked reception frequency band components may become in phase with each other at the output of the third terminal #3.

EFFECTS OF THE INVENTION

The present invention can provide a leakage power reduction apparatus that has a simple structure and can reduce leakage power from the transmitter side to the receiver side without lowering the power utilization efficiency.

The present invention is useful in reducing the power of the transmission signal leaking from the transmitter side to the receiver side in communication equipment which performs communication by utilize two frequencies in adjacent frequency bands to transmission and reception.

What is claimed is:

1. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band;

a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a reception band-pass filter which has one end connected between the second port of the circulator and the first terminal of the duplexer and is configured to attenuate components outside the reception frequency band; and a terminator which is connected to the other end of the reception band-pass filter and is configured to absorb a signal input thereto.

2. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band;

a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a transmission band-elimination filter which has one end connected between the second port of the circulator and the first terminal of the duplexer and is configured to attenuate the transmission frequency band component; and a terminator which is connected to the other end of the transmission band-elimination filter and is configured to absorb a signal input thereto.

3. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band;

a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a reception band-pass filter which has one end connected between the second port of the circulator and the first terminal of the duplexer and is configured to attenuate components outside the reception frequency band;

an attenuator which has one end connected to the other end of the reception band-pass filter and is configured to adjust the amplitude of a signal input thereto; and a reflector which is connected to the other end of the attenuator, and is configured to reflect an output signal of the attenuator and output an offset signal for the reception frequency band;

the offset signal for the reception frequency band being supplied to the combiner through the attenuator, the reception band-pass filter, the circulator, and the amplitude-and-phase adjuster to suppress a reception frequency band component of the leaking transmission signal included in the output signal sent from the third terminal of the duplexer.

4. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band;

a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a transmission band-elimination filter which has one end connected between the second port of the circulator and the first terminal of the duplexer and is configured to attenuate the transmission frequency band component;

an attenuator which has one end connected to the other end of the transmission band-elimination filter and is configured to adjust the amplitude of a signal input thereto; and a reflector which is connected to the other end of the attenuator and is configured to reflect an output signal of the attenuator and output an offset signal for the reception frequency band;

the offset signal for the reception frequency band being provided to the combiner through the attenuator, the transmission band-elimination filter, the circulator, and the amplitude-phase shifter to suppress a reception frequency band component of the leaking transmission signal included in the output signal sent from the third terminal of the duplexer.

5. The leakage power reduction apparatus according to any one of claim 1 to 4, further comprising a delay device which is inserted between the third terminal of the duplexer and the combiner and is configured to adjust the amount of delay of the output signal sent from the third terminal of the duplexer.

6. The leakage power reduction apparatus according to any one of claim 1 to 4, further comprising a phase shifter which is connected between the second terminal of the duplexer and the antenna and is configured to adjust the amount of phase shift of a signal input thereto.

7. The leakage power reduction apparatus according to any one of claim 1 to 4, wherein the amplitude-and-phase adjuster comprises an attenuator for adjusting the amplitude of an input signal and a phase shifter for adjusting the amount of phase shift of a signal input from the attenuator.

8. The leakage power reduction apparatus according to any one of claim 1 to 4, wherein the amplitude-and-phase adjuster comprises:
- a divider for dividing the signal from the third port of the circulator into two parts;
- first attenuation means which is configured to receive one of the two parts of the signal divided by the divider, adjust the amplitude thereof, and output a signal;
- first phase shift means which is configured to adjust the amount of phase shift of the signal output from the first attenuation means and output a signal;
- second attenuation means which is configured to receive the other part of the two parts of the signal divided by the divider, adjust the amplitude thereof, and output a signal;
- second phase shift means which is configured to adjust the amount of phase shift of the signal output from the second attenuation means and outputs a signal; and
- combining means which is configured to combine the signal output from the first phase shift means and the signal output from the second phase shift means, and output a combined signal as the offset signal for the transmission frequency band.

9. The leakage power reduction apparatus according to claim 8, further comprising a third phase shift means inserted between the antenna and the second terminal of the duplexer, said third phase shift means being set such that a first reception frequency band component of the transmission signal leaked from the second terminal to the third terminal of the duplexer and a second reception frequency band component of the transmission signal leaked from the first terminal directly to the third terminal of the duplexer are in phase with each other at the output of the third terminal of the duplexer.

10. A leakage power reduction apparatus for suppressing a leaking transmission signal leaking from a transmitter side to a receiver side, directly or through reflection by an antenna, the apparatus comprising:
- a circulator which comprises a first port, a second port, and a third port, outputs a transmission signal input from the first port to the second port, and outputs a signal input from the second port to the third port;
- a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;
- an amplitude-and-phase adjuster which is connected to the third port of the circulator and is configured to adjust the amplitude and phase of the signal input from the circulator, and output the adjusted signal as an offset signal for the transmission frequency band;
- a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;
- a reception band-pass filter which has one end connected between the second port of the circulator and the first terminal of the duplexer and is configured to attenuate components outside the reception frequency band; and
- an additional amplitude-and-phase adjuster which is connected to the other end of the reception band-pass filter and is configured to adjust the amplitude and phase of an output signal from the reception band-pass filter to generate an offset signal for the reception frequency band and provide the offset signal for the reception frequency band to the combiner;
- wherein the combiner is configured to suppress a reception frequency band component of the leaking transmission signal included in the output signal sent from the third terminal of the duplexer, by using the offset signal for the reception frequency band.

11. A leakage power reduction apparatus for suppressing a leaking transmission signal leaking from a transmitter side to a receiver side, directly or through reflection by an antenna, the apparatus comprising:
- a circulator which comprises a first port, a second port, and a third port, outputs a transmission signal input from the first port to the second port, and outputs a signal input from the second port to the third port;
- a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;
- an amplitude-and-phase adjuster which is connected to the third port of the circulator and is configured to adjust the amplitude and phase of the signal input from the circulator, and output the adjusted signal as an offset signal for the transmission frequency band;
- a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a transmission band-elimination filter which has one end connected between the second port of the circulator and the first terminal of the duplexer and is configured to attenuate the transmission frequency band component; and an additional amplitude-and-phase adjuster which is connected to the other end of the transmission band-elimination filter and is configured to adjust the amplitude and phase of an output signal from the transmission band-elimination filter to generate an offset signal for the reception frequency band and provide the offset signal for the reception frequency band to the combiner;

wherein the combiner is configured to suppress a reception frequency band component of the leaking transmission signal included in the output signal sent from the third terminal of the duplexer, by using the offset signal for the reception frequency band.

12. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band;

a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

a signal separator which comprises a first terminal, a second terminal connected to the third port of the circulator and a third terminal, and is configured to separate the signal output from the third port of the circulator into a transmission frequency band component and a reception frequency band component of the transmission signal, and output the components to the first terminal and the third terminal, respectively, one end of the amplitude-and-phase adjuster being connected to the first terminal of the signal separator, thereby being connected to the third port of the circulator through the signal separator; and an additional amplitude-and-phase adjuster which has one end connected to the third terminal of the signal separator, and is configured to adjust the amplitude and phase of an output signal from the third terminal of the signal separator to generate an offset signal for the reception frequency band, and provide the offset signal for the reception frequency band to the combiner;

wherein the combiner is configured to suppress a reception frequency band component of the leaking transmission signal included in the output signal sent from the third terminal of the duplexer, by using the offset signal for the reception frequency band.

13. The leakage power reduction apparatus according to claim 12, further comprising a signal combining means which is configured to combine the offset signal for the transmission frequency band and the offset signal for the reception frequency band sent from the amplitude-and-phase adjuster and the additional amplitude-and-phase adjuster and provide a combined signal to the combiner.

14. The leakage power reduction apparatus according to claim 12, wherein the signal separator is configured to allow a signal in the transmission frequency band to pass through and suppress a signal in the reception frequency band between the first terminal and the second terminal, allow a signal in the reception frequency band to pass through and suppress a signal in the transmission frequency band between the second terminal and the third terminal, and suppress a signal in the transmission frequency band and a signal in the reception frequency band between the first terminal and the third terminal.

15. A leakage power reduction apparatus for suppressing a leaking transmission signal leaking from a transmitter side to a receiver side, directly or through reflection by an antenna, the apparatus comprising:

a circulator which comprises a first port, a second port, and a third port, outputs a transmission signal input from the first port to the second port, and outputs a signal input from the second port to the third port;

a duplexer which comprises a first terminal, a second terminal, and a third terminal, the first and the second terminals being connected to the second port of the circulator and the antenna, respectively, said duplexer being configured such that a signal in a transmission frequency band is allowed to pass and a signal in a reception frequency band is suppressed between the first terminal and the second terminal, a signal in the reception frequency band being allowed to pass and a signal in the transmission frequency band is suppressed between the second terminal and the third terminal, and signals in the transmission frequency band and the reception frequency band both are suppressed between the first terminal and the third terminal;

an amplitude-and-phase adjuster which is connected to the third port of the circulator and is configured to adjust the amplitude and phase of the signal input from the circulator, and output the adjusted signal as an offset signal for the transmission frequency band; and a combiner which is configured to receive an output signal sent from the third terminal of the duplexer and the offset signal for the transmission frequency band sent from the amplitude-and-phase adjuster, and output a signal obtained by suppressing a transmission frequency band component of the leaking transmission signal included in the output signal sent from the third terminal of the duplexer by the offset signal for the transmission frequency band;

wherein the amplitude-and-phase adjuster comprises:

a divider for dividing the signal from the third port of the circulator into two parts;

first attenuation means which is configured to receive one of the two parts of the signal divided by the divider, adjust the amplitude thereof, and output a signal;

first phase shift means which is configured to adjust the amount of phase shift of the signal output from the first attenuation means and output a signal;

second attenuation means which is configured to receive the other part of the two parts of the signal divided by the divider, adjust the amplitude thereof, and output a signal;

second phase shift means which is configured to adjust the amount of phase shift of the signal output from the second attenuation means and outputs a signal; and combining means which is configured to combine the signal output from the first phase shift means and the signal output from the second phase shift means, and output a combined signal as the offset signal for the transmission frequency band; and wherein the leakage power reduction apparatus further comprising:

a third phase shift means inserted between the antenna and the second terminal of the duplexer, said third phase shift means being set such that a first reception frequency band component of the transmission signal leaked from the second terminal to the third terminal of the duplexer and a second reception frequency band component of the transmission signal leaked from the first terminal directly to the third terminal of the duplexer are in phase with each other at the output of the third terminal of the duplexer.

* * * * *